Sept. 4, 1956 R. KOGGE 2,762,011
ALTERNATING CURRENT POWER AMPLIFIER
Filed June 30, 1952
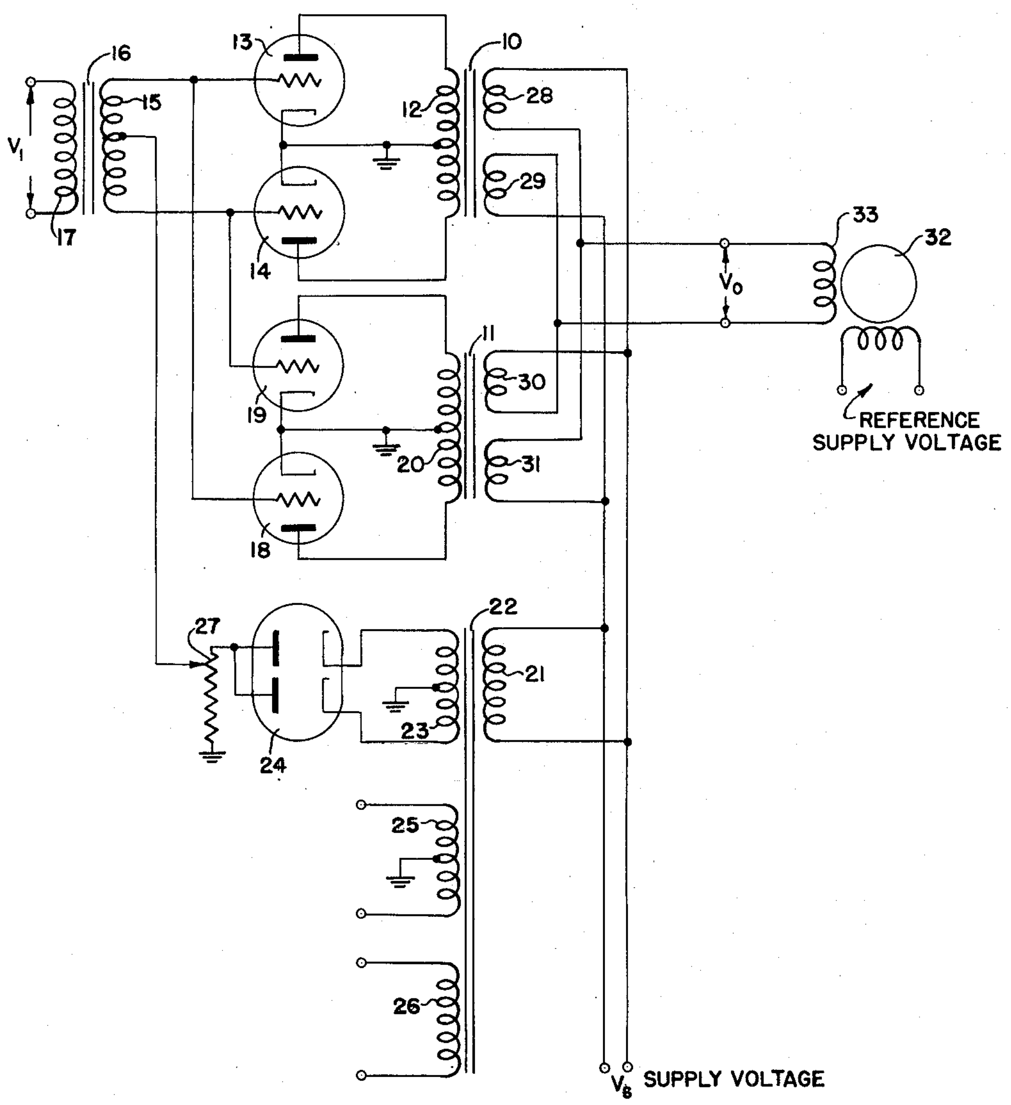
INVENTOR
ROY KOGGE
BY
ATTORNEYS United States Patent Office 2,762,011

Patented Sept. 4, 1956

2,762,011

ALTERNATING CURRENT POWER AMPLIFIER

Roy Kogge, Silver Spring, Md.

Application June 30, 1952, Serial No. 296,510

2 Claims. (Cl. 323—86)

(Granted under Title 35, U. S. Code (1952), sec. 266)

The invention described herein may be manufactured and used by or for the Government of the United States of America for governmental purposes without the payment of any royalties thereon or therefor.

This invention relates to alternating current power amplifiers and more particularly to a high power vacuum tube amplifying system which requires no D. C. plate voltage supply.

In several types of electronic circuits, such as, for instance, in servo-mechanism circuits for gun fire control systems, it is desirable that an amplifier capable of handling high powers with long life and high plate efficiency be utilized to produce a well shaped output wave form without the requirement of a D. C. plate supply. It is also desirable that such an amplifier produce no time delay at the servo frequencies and that there be no generated harmonics of the carrier frequency involved.

Accordingly, it is an object of the present invention to provide a power amplifier for alternating current of single frequency, in which vacuum tubes are employed without the requirement of a D. C. plate supply for the tubes.

Another object is to provide an alternating current power amplifier having a high power handling ability throughout the long life of the amplifier system.

A further object is to provide an amplifier having low heat dissipation and high plate efficiency which produces a good output wave form with no generated harmonics.

A still further object is to provide an alternating power amplifier useful in servo systems which produces no time delay at servo frequencies and in which adverse effects due to interaction or interference of current surges in the supply line are kept at a minimum.

Other objects and many of the attendant advantages of this invention will be readily appreciated as the same becomes better understood by reference to the following detailed description when considered in connection with the accompanying drawing which shows a schematic diagram of the alternating current power amplifier which is one embodiment of the present invention.

Referring now to the drawing, there is shown a pair of alternating current transformers 10 and 11, the primaries of which are energized by an alternating current supply voltage designated as $V_s$. The secondary 12 of the input transformer 10 has its respective ends connected to the plates of a pair of vacuum tubes 13 and 14 which are connected in a push-pull arrangement in which the cathodes of the tubes are connected together to the center tap of the secondary 12 which is grounded. The grids of the tubes 13 and 14 are connected to the opposite ends of the secondary 15 of a signal transformer 16, the primary 17 of which is fed by an input signal designated $V_i$ which is of the same frequency as $V_s$.

The grid of the tube 13 is also connected to the grid of a tube 18 which operates in push-pull relationship with a vacuum tube 19, the grid of which is connected to the grid of the tube 14. The plates of the tubes 18 and 19 are connected to opposite ends of the secondary 20 of the input transformer 11, the center tap of the secondary being grounded and connected to the cathodes of the tubes 18 and 19 which are connected together.

The supply voltage $V_s$ also supplies energization for the primary 21 of a power transformer 22. A high voltage winding 23 in the secondary of the transformer 22 may be connected to the cathodes of a dual diode 24, which is connected in the circuit as a conventional full wave rectifier. A pair of low voltage windings 25 and 26 in the secondary of the power transformer 22 may be used to supply heater current for the tubes in the circuit, the winding 26 supplying filament power for the dual diode 24 and the winding 25 supplying the four push-pull tubes 13, 14, 18 and 19. The output of the full wave rectifier is taken across a potentiometer 27 the control arm of which is connected to the center tap of the secondary 15 of the signal transformer 16 to supply a bias voltage to the grids of the four push-pull tubes which is of sufficient value to normally maintain the tubes just above cutoff.

The two input windings 28 and 29 of the input transformer 10 form two arms of a bridge circuit, the other two arms of which are formed by the primary windings 30 and 31 of the input transformer 11. The output of the bridge circuit is used as the output of the amplifier and is designated $V_o$. For illustrative purposes the load has been shown as a two phase servomotor 32, one phase 33 of which is controlled by the output of the bridge circuit, however, it is to be understood that the amplifier may be used for purposes other than the energization of servo mechanisms.

When the push-pull tubes 13, 14, 18 and 19 are nonconducting a high impedance is reflected into the primary circuits of the transformers 10 and 11 and the bridge will be balanced. Upon the application of an input signal to the primary 17, which in the present illustration may be considered to be the error voltage and the error rate of change of a servo system, one of the push-pull tubes will begin to conduct and the effective impedance transferred to the primary windings is accordingly reduced to thus cause an unbalance in the bridge. An unbalance in the bridge circuit causes current to flow through one phase of the two phase servo motor thus producing a torque output from the motor to be utilized in any desired manner. Thus it can be seen that power is fed to the load in proportion to the unbalance of the bridge, the magnitude of the unbalance being proportional to the magnitude of the input voltage $V_i$, and the direction of unbalance and thus the direction of rotation of the motor being dependent upon the phase of the input voltage $V_i$. For instance, with polarities on the input transformers 10 and 11 as shown on the drawing, a positive A. C. voltage may be assumed to exist simultaneously at the plates of the tubes 14 and 18 therefor causing these tubes to conduct if a positive voltage appears at the same time on the grid of either of the tubes. The voltage input $V_i$, which is of the same frequency as the supply voltage $V_s$, may be either in phase with or 180° out of phase with $V_s$ so that if a positive voltage is appearing at the grid of the tube 14 a negative voltage simultaneously appears at the grid of the tube 18 and therefor only the tube 14 will conduct. The amount of plate current flowing through the tube 14 will of course be dependent upon the magnitude of the input signal and, hence, upon conduction of the tube a low impedance is reflected to the bridge arm 29 to cause an unbalance in the bridge circuit. Unbalance in the other arms of the bridge circuit is in a like manner caused by a similar simultaneous occurrence of positive A. C. on the plate and on the grid of the tube. Thus it can be seen that a complete control is obtained for the servo motor by properly controlling the unbalance in the bridge circuit to produce the desired voltage output $V_o$.

When the amplifier is employed to control a servo motor in accordance with the present invention, the E. M. F. generated by the motion of the motor is fed back through the control transformer to the plates of the tubes. When this occurs the bias on the grids of the tubes will allow one of the tubes to conduct and thereby apply a brake to the motor, as is well known. By this arrangement, if desired, the degree of damping of the motor may be controlled at will by the proper setting of the potentiometer 27 which controls the grid bias voltage of the tubes.

The present amplifier has the ability to handle a great deal of power with a good output waveform due to the utilization of full wave bias. The push-pull arrangement eliminates undesirable harmonies and enables the tubes to operate at high plate efficiency with less heat dissipation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An alternating current power amplifier comprising a first control transformer consisting of a secondary and a pair of primary windings, a second control transformer consisting of a secondary and a pair of primary windings, the pairs of primary windings of said first and second control transformers being connected as a bridge circuit and being energized by an A. C. supply voltage, a first pair of electronic tubes connected in push-pull arrangement to the secondary of said first control transformer, a second pair of electronic tubes connected in push-pull arrangement with the secondary of the second control transformer, each of said tubes having a control grid the control grids of one of said first pair of tubes and one of said second pair of tubes being connected together, the control grids of the other of said first pair of tubes and the other of said second pair of tubes being connected together, full wave rectifying means energized by said supply voltage for supplying D. C. bias to the first and second pairs of tubes, and signal input means for supplying an A. C. signal of the same frequency as the supply voltage to the grids of said ones of said first and second pairs of tubes and a signal of opposite polarity to grids of said others of said pairs of tubes so that one of the tubes is caused to conduct when the instantaneous A. C. voltage on its grid and plate are simultaneously positive to thereby reflect a decreased impedance into one of the primary windings to cause an unbalance in the bridge circuit and produce an output voltage across the bridge circuit of the same frequency and the same phase as the input signal.

2. An alternating current amplifier comprising first and second control transformers each having a secondary winding and a pair of primary windings, the primary windings of said first and second transformers being connected to form a balanced bridge circuit, an alternating current source connected to said bridge circuit for applying an operating potential thereto, a first pair of triode tubes, the plate of one of said first pair of tubes being connected to one end of the secondary winding of said first transformer and the plate of the other of said first pair of tubes being connected to the other end of the secondary winding of said first transformer, a second pair of triode tubes, the plate of one tube of said second pair being connected to one end of the secondary winding of said second transformer and the plate of the other tube of said second pair being connected to the other end of the secondary winding of said second transformer, the grids of said ones of said first and second pairs of tubes being connected together and the grids of said others of said first and second pairs of tubes being connected, full-wave rectifying means energized by said alternating current source for deriving therefrom a full-wave D. C. voltage, an input circuit connected to the grids of said first and second pairs of tubes for applying an alternating current input signal to said grids whereby said first and second pairs of tubes coact to unbalance said bridge circuit in a manner correlative to said input signal, circuit means including adjustable resistance means for applying a predetermined potential value of said derived D. C. voltage through said input circuit to the grids of said first and second pairs of tubes as a full-wave D. C. bias therefor, said predetermined potential value being sufficient to normally maintain the tubes jut above cutoff, and an output circuit connected to said bridge circuit for utilizing said bridge unbalance.

References Cited in the file of this patent

UNITED STATES PATENTS

| | | |
|---|---|---|
| 2,363,342 | Lesnick | Nov. 21, 1944 |
| 2,423,228 | Conklin | July 1, 1947 |
| 2,627,061 | Radigan | Jan. 27, 1953 |
| 2,686,290 | Macklem | Aug. 10, 1954 |